(12) United States Patent
Jia et al.

(10) Patent No.: US 12,009,933 B2
(45) Date of Patent: *Jun. 11, 2024

(54) ADAPTIVE REPETITION IN WIRELESS COMMUNICATION SYSTEMS

(71) Applicant: AT&T Intellectual Property I, L.P., Atlanta, GA (US)

(72) Inventors: Yupeng Jia, Austin, TX (US); Darwin Parra, Austin, TX (US); Prabhakara Aithal, Austin, TX (US); Ping-Chun Hsieh, College Station, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 980 days.

This patent is subject to a terminal disclaimer.

(21) Appl. No.: 16/986,328

(22) Filed: Aug. 6, 2020

(65) Prior Publication Data

US 2020/0366424 A1 Nov. 19, 2020

Related U.S. Application Data

(63) Continuation of application No. 15/982,117, filed on May 17, 2018, now Pat. No. 10,771,198.

(51) Int. Cl.
*H04L 1/1825* (2023.01)
*H04L 1/00* (2006.01)
*H04L 1/20* (2006.01)

(52) U.S. Cl.
CPC .......... *H04L 1/1825* (2013.01); *H04L 1/0002* (2013.01); *H04L 1/003* (2013.01); *H04L 1/20* (2013.01)

(58) Field of Classification Search
CPC ..... H04L 1/1825; H04L 1/0002; H04L 1/003; H04L 1/20; H04L 1/0026; H04L 1/08; H04L 1/189; H04L 1/0009
See application file for complete search history.

(56) References Cited

U.S. PATENT DOCUMENTS 9,450,728 B2 9/2016 Montojo et al.
9,571,953 B2 2/2017 Wong et al.
(Continued)

FOREIGN PATENT DOCUMENTS

WO WO-2018045302 A1 * 3/2018

OTHER PUBLICATIONS

Non-Final Office Action received for U.S. Appl. No. 15/982,117 dated Jun. 24, 2019, 44 pages.
(Continued)

*Primary Examiner* — Charles C Jiang
*Assistant Examiner* — Debebe A Asefa

(57) ABSTRACT

The described technology is generally directed towards adaptively selecting a repetition level in wireless communications, based on events to improve coverage range via the repetition level while not unnecessarily reducing throughput. One such event can include a current signal-to-noise-ratio, e.g., as reported in a channel quality indicator report from a user equipment. Another such event can comprise a number of consecutive hybrid automatic repeat request acknowledgments or negative acknowledgments (HARQ ACKS/NACKS), in which consecutive ACKs tend to indicate good signal quality, while consecutive NACKs tend to indicate poor signal quality. A combination of channel quality indicator-based adaptive repetition level and HARQ ACK/NACK-based adaptive repetition level can be employed.

20 Claims, 12 Drawing Sheets

(56) References Cited

U.S. PATENT DOCUMENTS

| | | | |
|---|---|---|---|
| 9,860,919 | B2 | 1/2018 | Yang et al. |
| 9,912,460 | B2 | 3/2018 | Papasakellariou et al. |
| 9,955,356 | B2 | 4/2018 | Xiong et al. |
| 2010/0115575 | A1 | 5/2010 | Yu et al. |
| 2010/0115576 | A1* | 5/2010 | Hale ................... H04L 67/56 |
| | | | 717/172 |
| 2016/0330698 | A1 | 11/2016 | Loehr et al. |
| 2016/0353440 | A1 | 12/2016 | Lee et al. |
| 2017/0141833 | A1 | 5/2017 | Kim et al. |
| 2017/0141903 | A1 | 5/2017 | Xu et al. |
| 2017/0245265 | A1 | 8/2017 | Hwang et al. |
| 2017/0303248 | A1 | 10/2017 | Chatterjee et al. |
| 2017/0347361 | A1 | 11/2017 | Tsuboi et al. |
| 2017/0374570 | A1 | 12/2017 | Yi et al. |
| 2018/0084578 | A1 | 3/2018 | Kato et al. |
| 2018/0234881 | A1* | 8/2018 | Hosseini ............... H04W 72/23 |
| 2018/0367185 | A1 | 12/2018 | Yi et al. |

OTHER PUBLICATIONS

Dahlman, et al., "4G, LTE-Advanced Pro and The Road to 5G", Third Edition, Copyright © 2016, 587 pages.
Final Office Action received for U.S. Appl. No. 15/982,117 dated Nov. 18, 2019, 47 pages.
U.S. Appl. No. 15/982,117, filed May 17, 2018.

* cited by examiner

ADAPTIVE REPETITION IN WIRELESS COMMUNICATION SYSTEMS

RELATED APPLICATION

The subject patent application is a continuation of, and claims priority to, U.S. patent application Ser. No. 15/982,117, filed May 17, 2018, and entitled "ADAPTIVE REPETITION IN WIRELESS COMMUNICATION SYSTEMS," the entirety of which application is hereby incorporated by reference herein.

TECHNICAL FIELD

The subject application is related to wireless communication systems, and, for example, to dynamic adaptation of repetition levels for wireless communications, such as for use in machine-type communication devices, in a wireless communication system.

BACKGROUND

In wireless communication systems, providing a deep coverage range for a wireless device is generally desirable, including when using machine-type communication (MTC) which can operate in a low-power, low-mobility, low-data-rate, and delay-insensitive environment. Other devices such as wearables with small antennas, and even cell-phones or the like operating in poor signal condition scenarios (e.g., in an underground parking garage) benefit from improved coverage.

Repetition is one way to enhance coverage, that is, to schedule a data block multiple times to improve the likelihood of at least one repeated data block being correctly received. However, while repetition is beneficial for coverage, repetition costs resources/reduces throughput, and thus if overdone leads to an unnecessary waste of network resources, which degrades the overall network performance.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
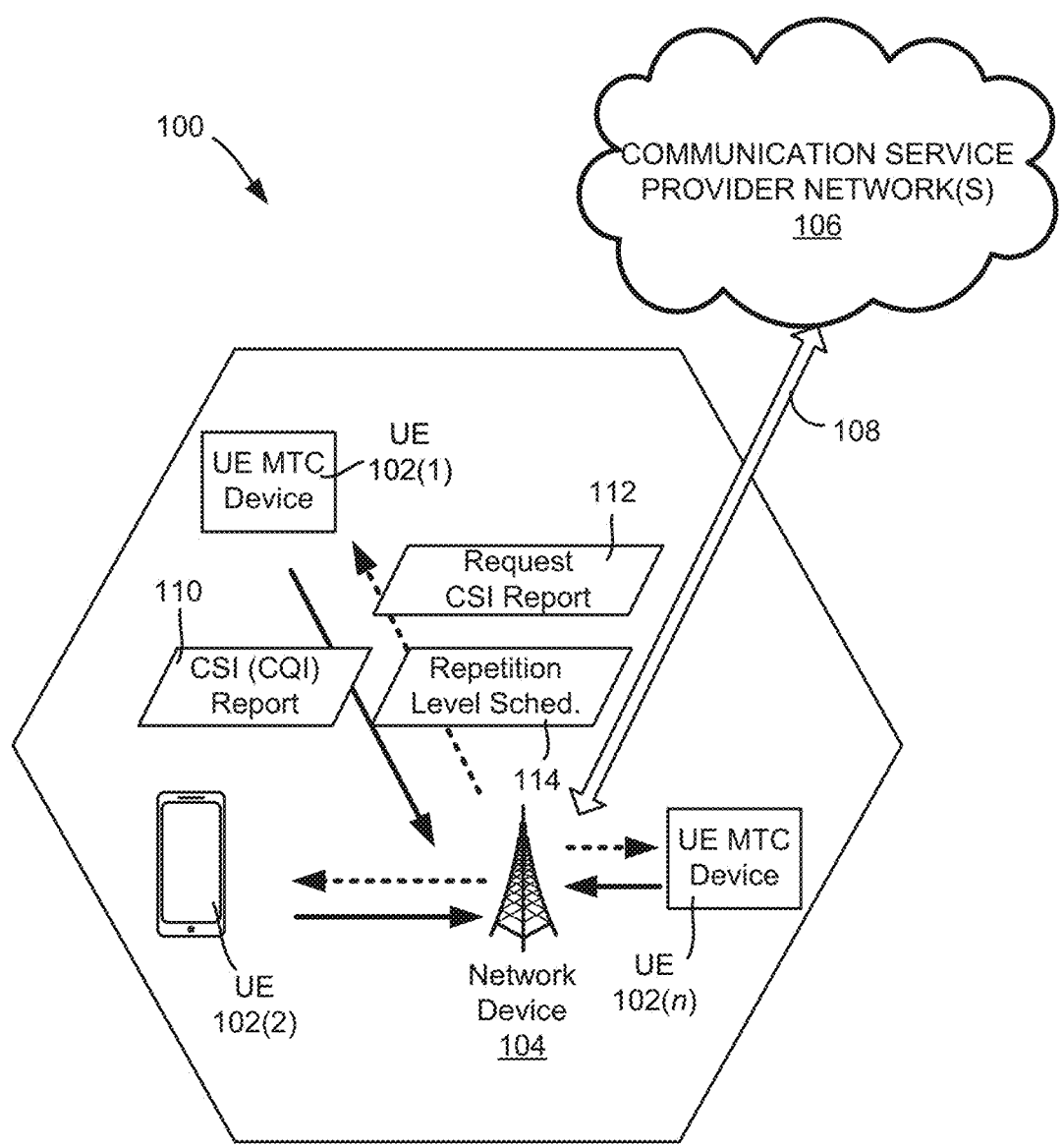
FIG. 1 illustrates an example wireless communication system in which a network node device (e.g., network node) schedules user equipment (UE) communication with a repetition level based on a channel quality data report event, in accordance with various aspects and implementations of the subject disclosure.

Briefly, one or more aspects of the technology described herein are generally directed towards an adaptive repetition technology for wireless communications, in which a wireless network dynamically chooses a more optimal repetition level for user equipment communications, in a way that attempts to achieve the desired coverage while working to increase throughput at the same time. By adapting the repetition level used for scheduling data communications generally based on actual, current signal conditions, a repetition level is found that improves (towards an optimal level) the tradeoff between the repetition level and resource usage. Note that as used herein, "configuring" or "reconfiguring" the user equipment with a repetition level comprises "scheduling" the user equipment with the repetition level.

By way of example, consider downlink transmissions from a network device (e.g., eNB) to a single user equipment (UE), in which both eight repetitions and sixteen repetitions achieve the required coverage. In this situation, choosing the lower repetition level equal to eight is more optimal in terms of throughput. Thus, while higher repetition level generally provides better coverage, using an unnecessarily high repetition level can waste network resources and unnecessary degrade network throughput. Described herein is adapting the repetition level by updating the repetition level for a user equipment according to the channel quality (as well as initially choosing a likely good repetition level based on the initial channel quality, or starting at a maximum repetition level and decreasing to a more optimal level, for example).

Aspects described herein comprise event-triggered repetition selection schemes to dynamically change the repetition level according to the channel quality of each UE. More particularly, changes of repetition level are triggered by events, which can be customized by the network for different scenarios.

In one or more implementations, an event-based adaptive repetition level technology is based on the SNR (signal-to-noise) ratio, which basically can be obtained via a channel quality indicator (CQI) report (e.g., part of the channel state information, or CSI report that the user equipment sends periodically or on demand). In general, in this alternative, the network chooses the repetition level based on the channel quality indicator report.

In one or more implementations, another event-based adaptive repetition level technology is based on the hybrid automatic repeat request (HARQ) feedback events. As generally described herein, in this alternative the network increases (e.g., doubles) the repetition level upon receiving consecutive negative acknowledgements (NACKs) that exceed a consecutive NACK threshold value, $N_{NACK}$. Conversely, the network decreases (e.g., halves) the repetition level upon receiving consecutive acknowledgements (ACKs) that exceed a consecutive ACK threshold value. As is understood, the better the channel quality, the greater the chance of consecutive ACKs, and thus less repetition is needed, whereas poorer channel quality tends to cause consecutive NACKs, which are detected to increase the repetition level. Note that the HARQ-based adaptive repetition scheme can operate when a CQI report is not available, (such as for CE Mode B devices, where coverage-enhancement (CE) modes A and B are described herein with respect to repetition levels).

In one or more implementations, an event-based adaptive repetition level technology can be based on both the channel quality indicator report event and the hybrid automatic repeat request (HARQ) feedback events. For example, the HARQ feedback events can be used to regularly adapt the repetition level with respect to communications, which can be modified when the channel quality indicator report (which gathers more direct channel quality data over a longer time) is received and processed, with the HARQ feedback event scheme resuming thereafter, continuing until the next channel quality indicator report, and so on.

It should be understood that any of the examples and terms used herein are non-limiting. For instance, examples can be based on New Radio (NR, sometimes referred to as 5G) communications between a user equipment exemplified as a machine type communication device or the like and network device; however virtually any communication system may benefit from the technology described herein, and/or their use in different spectrums may likewise benefit. For instance, while machine type communication devices are examples of such wireless devices, the technology is not limited to machine type communication devices; but rather any wireless-capable user equipment may benefit from the technology described herein, including, wearables, smartphones, tablets, notebooks, modems (cards, dongles/adapters (e.g., USB)) and so on. Indeed, any communication system capable of using repetition may benefit from the technology described herein. Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

FIG. 1 illustrates an example wireless communication system 100 in accordance with various aspects and embodiments of the subject technology. In one or more embodiments, the system 100 can comprise one or more user equipment, e.g., UEs 102(1)-102(n). The user equipments 102(1)-102(n) exemplified in FIG. 1 (and FIG. 2) can be any combination of category(ies) of machine type communication (MTC) device(s), cell phones, wearables, and so on.

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network devices 104 represents uplink (UL) communications.

The system 100 can further include one or more communication service provider networks 106 that facilitate providing wireless communication services to various UEs, including UES 102(1)-102(n), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UEs 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to provide the network device with a channel quality indicator report 110, (which can be part of a larger channel state information, or CSI report, send periodically and/or on demand from the network device 104 (e.g., requested via block 114). As will be understood, the channel quality indicator report 110 can be used by the network node as a basis for adaptively determining a repetition level used in scheduling (block 114) user equipment communications.

Figure 2:
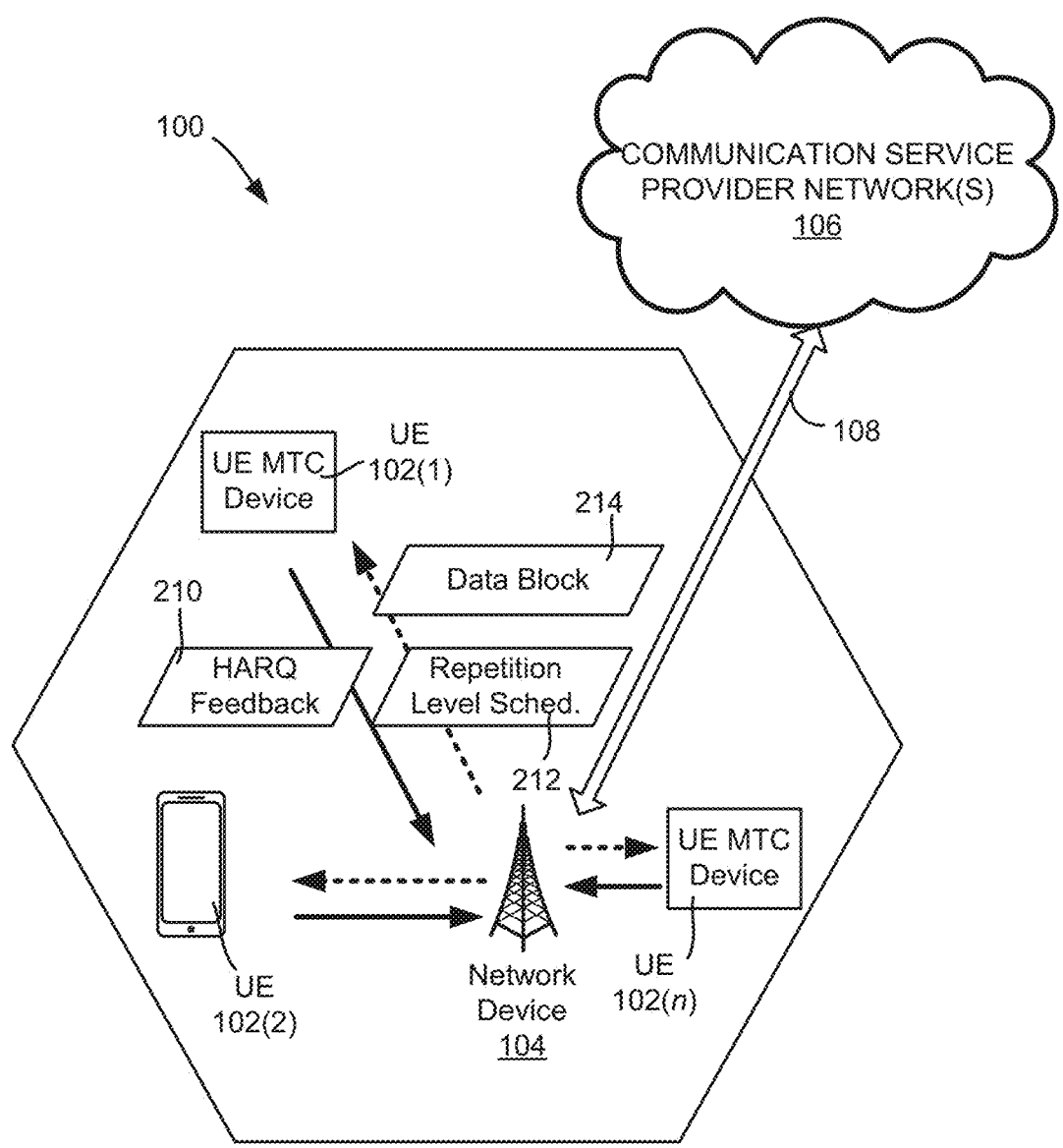
FIG. 2 illustrates an example wireless communication system in which a network node device (e.g., network node) schedules user equipment (UE) communication with a repetition level based on a hybrid automatic repeat request (HARQ) feedback events, in accordance with various aspects and implementations of the subject disclosure.

FIG. 2 is generally similar to FIG. 1, except that instead of (or in addition to) CQI report-based adaptive repetition level scheduling, hybrid automatic repeat request (HARQ) feedback-based (block 210) adaptive repetition level scheduling 212 is used. To this end, when a data block 214 is communicated to a user equipment, the HARQ feedback 210 (acknowledgment or negative acknowledgment) that is received can be used as described herein to decide whether to adaptively increase or decrease the repetition level; (it is also feasible to leave the repetition level as is).

As is understood, the adaptive repetition level as described herein can be applied to uplink and/or downlink communications, and there can be a different uplink repetition level relative to the downlink repetition level. Indeed, the technology described herein can be applied to any/all physical channels; for example, for random access channels, adaptive repetition level technology can help minimize the initial acquisition time. For physical downlink or uplink channels, the adaptive repetition level technology described herein can work to maximize throughput while achieving the required coverage.

Figure 3:
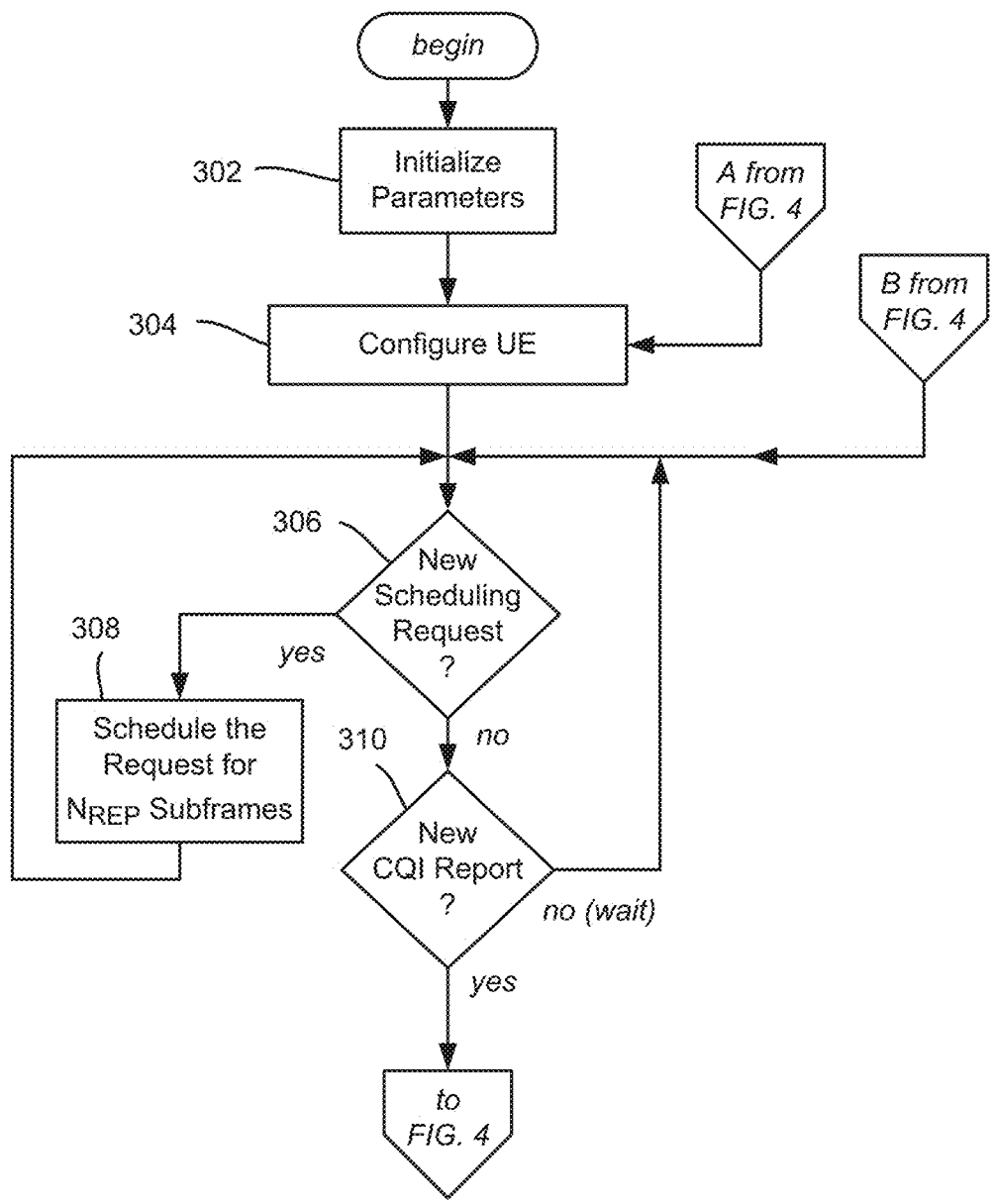
FIGS. 3 and 4 illustrate an example flow diagram of network node operations for scheduling user equipment with a repetition level that depends on channel quality data, in accordance with various aspects and implementations of the subject disclosure.
Figure 4:
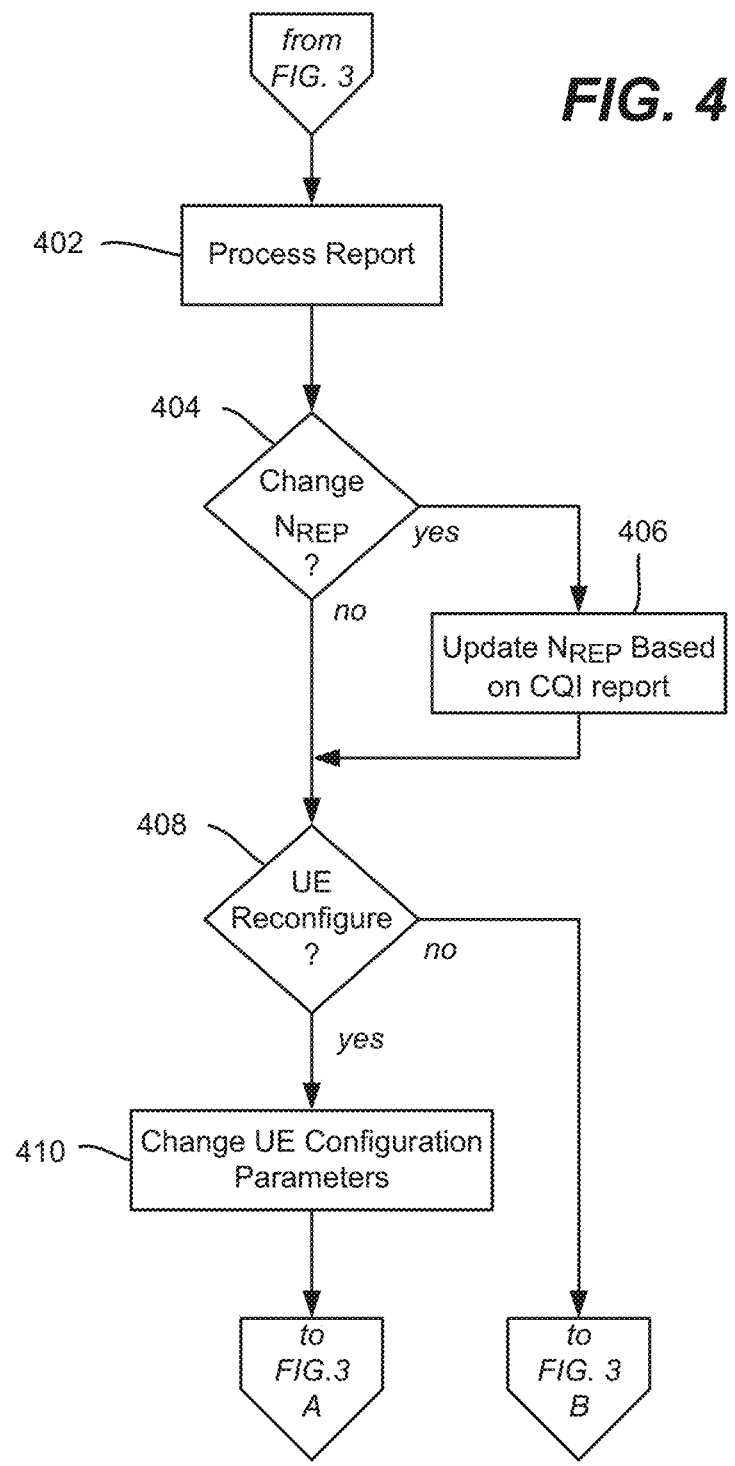

FIGS. 3 and 4 comprise a flow diagram showing example operations that a network device can use to schedule user equipment communications using a repetition level based on a channel quality indicator report. Operation 302 represents initializing parameters, including, for example, a repetition level and other initial data (e.g., including parameter values) that a user equipment needs to communicate with a network device. Operation 304 represents configuring the user equipment with the parameter values and the like; note that a channel state information report, which typically includes a channel quality indicator report, can be previously received at the network device from the user equipment and used as at least part of the basis for the initialization/configuration at operations 302 and 304.

Operation 306, in conjunction with operation 310, represents waiting for a new scheduling request, and/or waiting for a new channel quality indicator (CQI) report. For a new scheduling request, operation 308 schedules the request for $N_{REP}$ subframes, where $N_{REP}$ is the current value of the repetition level.

For a new channel quality indicator (CQI) report, operation 402 of FIG. 4 represents processing the report to determine the current signal quality. In general, a lower equality corresponds to a higher repetition level, and a higher signal quality corresponds to a lower repetition level. The following table can be used for CE Mode A and CE Mode B machine type communication device modes, wherein, for example the reported CQI, corresponding to the signal to noise ratio, can map or otherwise be mathematically coupled (e.g., as experimentally measured) to one of the repetition number values based on the mode in use (which may depend on the type of device):

| PDSCH/PUSCH Repetition Numbers for CE Mode A and CE Mode B | |
|---|---|
| CE Mode A | CE Mode B |
| Set 1 {1, 2, 4, 8} | {4, 8, 16, 32, 64, 128, 256, 512} |
| Set 2 {1, 4, 8, 16} | {1, 4, 8, 16, 32, 64, 128, 192} |
| Set 3 {1, 4, 16, 32} | {4, 8, 16, 32, 64, 128, 192, 256} |
| Set 4 — | {4, 16, 32, 64, 128, 192, 256, 384} |
| Set 5 — | {4, 16, 64, 128, 192, 256, 384, 512} |
| Set 6 — | {8, 32, 128, 192, 256, 384, 512, 768} |
| Set 7 — | {4, 8, 16, 64, 128, 256, 512, 1024} |
| Set 8 — | {4, 16, 64, 256, 512, 768, 1024, 1536} |
| Set 9 — | {4, 16, 64, 128, 256, 512, 1024, 2048} |

Note that a similar table of repetition numbers can be used with other devices, e.g., obtained experientially or otherwise for cell phones, wearables, and so on.

Operations 404 and 406 change the repetition level, NREP if needed, based on the CQI report data. Operation 408 represents determining if any other UE configuration parameter(s) need to be changed, and if so, operation 410 changes those parameter(s). Depending on whether the UE needs to be reconfigured, the process returns to operation 304 of FIG. 3 or operation 306 of FIG. 3.

Figure 5:
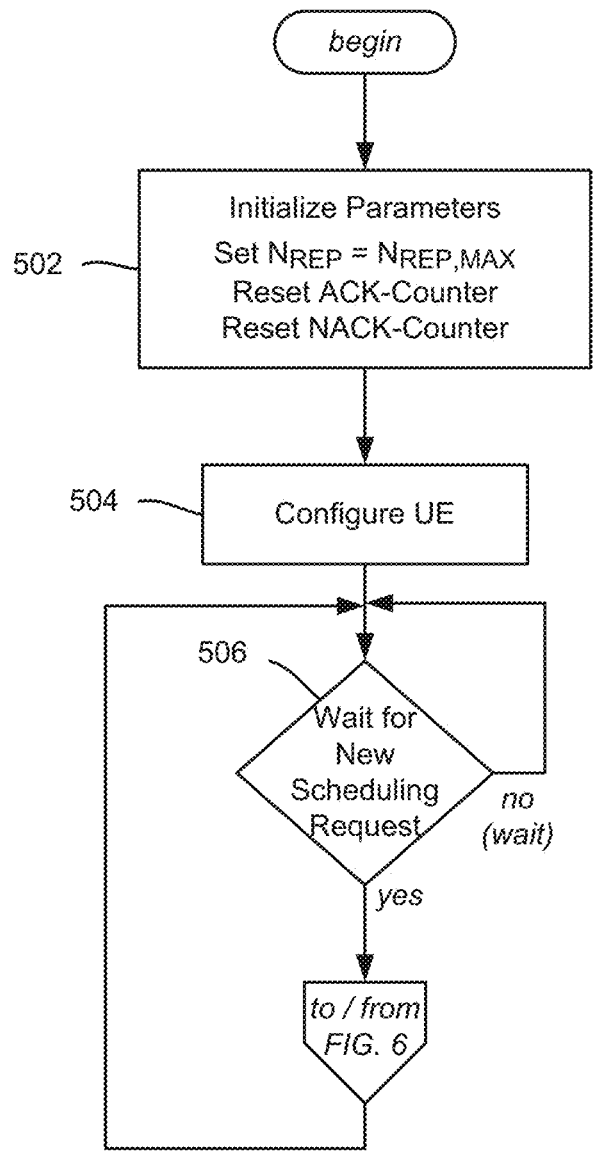
FIGS. 5 and 6 illustrate an example flow diagram of network node operations for scheduling user equipment with a repetition level that depends on HARQ feedback events, in accordance with various aspects and implementations of the subject disclosure.
Figure 6:
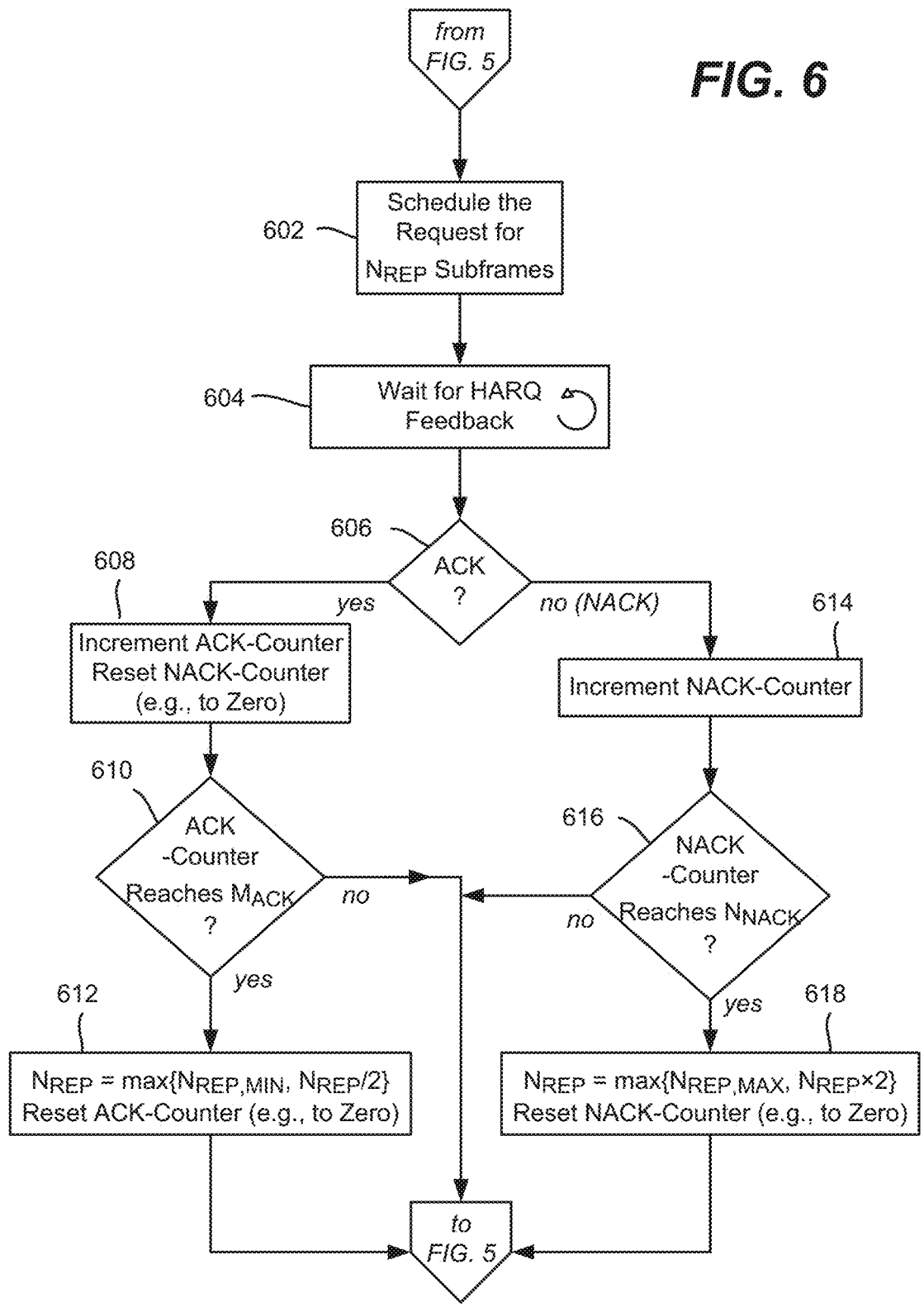

FIGS. 5 and 6 comprise a flow diagram of example operations for implementing a HARQ feedback-based adaptive repetition scheme. Operation 502 represents initializing parameters, including the repetition level, which in this example is set to the maximum possible repetition for the device, $N_{REP,MAX}$. note that it is feasible to have a different starting repetition level (e.g., the minimum, random, approximate middle and so on), including based on the initial channel quality if known, however starting at the maximum $N_{REP,MAX}$ ensures the best possible coverage initially at the (possible) temporary cost of unnecessary resources for a relatively small number of data block communications. Operation 502 also resets two counters, an ACK-Counter and a NACK-Counter, which are used as described herein with reference to FIG. 6.

Operation 506 represents waiting for a new scheduling request. When received, the process branches to operation 602 of FIG. 6.

Operation 602 represents scheduling the communication request for $N_{REP}$ subframes. Operation 604 represents waiting for the HARQ feedback, that is, an acknowledgement or negative acknowledgment in this example.

Operation 606 represents distinguishing an acknowledgement from a negative acknowledgment. If an acknowledgment, the ACK-Counter is incremented at operation 608, and the NACK-Counter is reset, e.g., to zero, because there are no longer any consecutive NACKs. Note that it is feasible to reset the NACK-Counter to another value, such as to subtract two from it if above three, and so on, such as to be more conservative with respect to increasing the repetition level versus decreasing the level or the like.

In this example, at operation 610, the incremented ACK-Counter is evaluated against a threshold value for consecutive acknowledgments, $M_{ACK}$. If not reached, the process returns to FIG. 5, operation 506. If reached, then the current quality is considered good, and the repetition level is decreased, down to its maximum possible value. As repetition levels can be specified according to powers of two, operation 612 can decrease the level by dividing by two if the level was at two or above to obtain a new current repetition level $N_{REP}$. Operation 612 can also reset the ACK-Counter so that $M_{ACK}$ consecutive acknowledgements are again needed before decreasing the repetition level another time. Note that again, the resetting need not be to zero, and can, for example be a negative number to make the next $M_{ACK}$ consecutive acknowledgement threshold harder to reach, can be greater than zero to make the next $M_{ACK}$ consecutive acknowledgement threshold easier to reach, can be a function of/lookup based on the current $N_{REP}$ repetition level, and so on. It is also feasible to have a variable threshold $M_{ACK}$ for a similar purpose.

Operations 614, 616 and 618 are similar to those of operations 608, 610 and 612, except for negative acknowledgments. Thus, the NACK-Counter is incremented (operation 614), the counter evaluated against a negative threshold value $N_{NACK}$ (which can be the same as or different from the (positive) acknowledgement threshold value $M_{ACK}$), and if reached, the NREP repetition level increased (e.g., doubled) up to its maximum possible value. The NACK-Counter can be reset, which in in one more implementations is reset to zero, although as described above with respect to resetting the ACK-Counter, other values can be used in other implementations.

In this way, the HARQ feedback is used to dynamically update the repetition level in a controlled way, e.g., based on a network-specified threshold number of consecutive acknowledgements or negative acknowledgements. Note that although not shown, it is understood that the network device can request a channel quality indicator report at any time and change the repetition level, e.g., as shown in FIGS. 3 and 4, independent of the HARQ feedback-determined level. In one or more implementations this also can reset the counters, for example, and the operations of FIGS. 5 and 6 can adapt the repetition level from there. Thus, it is straightforward to combine the example operations of FIGS. 3 and 4 with the example operations of FIGS. 5 and 6, which can make the repetition scheme even more adaptive to time-varying wireless channels. Note however that not all devices are capable of returning a channel quality indicator report, (such as CE Mode B devices), and thus such a combination of adaptive repetition levels based on both CQI reports and HARQ feedback cannot be used with such devices.

Figure 7:
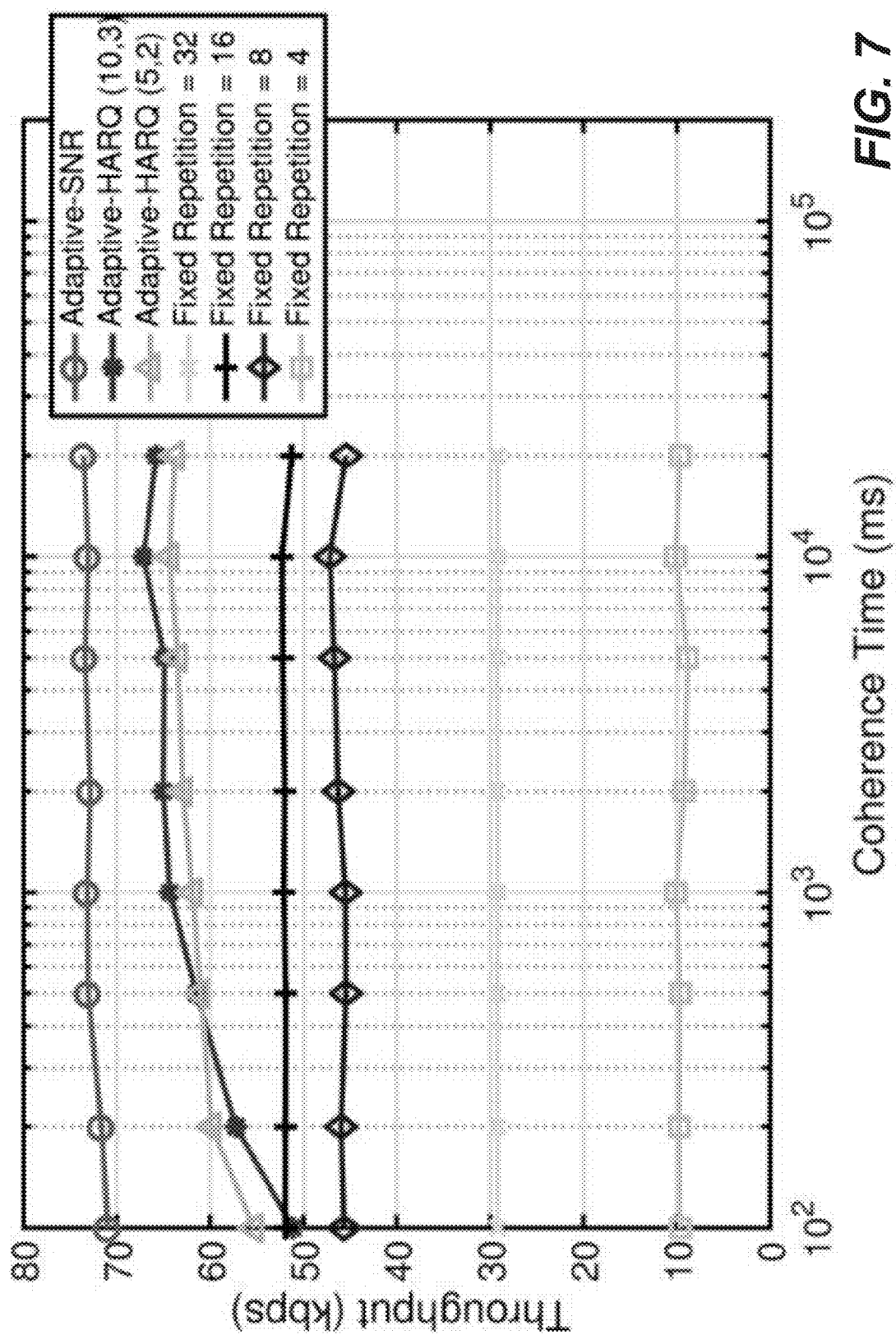
FIG. 7 illustrates an example graph of average throughput versus coherence time for different repetition schemes, including repetition schemes based on channel quality data and HARQ feedback events, in accordance with various aspects and implementations of the subject disclosure.

FIG. 7 illustrates an example graph of average throughput versus coherence time for different repetition schemes, where coherence time can be defined as the duration in which the channel condition stays the same. Note that with MTC devices, which usually have relatively low mobility, the corresponding coherence time is expected to be large. Note that the SNR-CQI adaptive repetition level technology described herein with reference to FIGS. 1, 3 and 4 is denoted as Adaptive-SNR, while the HARQ-based adaptive repetition level technology described herein with reference to FIGS. 2, 5 and 6 with parameters $M_{ACK}$ and $N_{NACK}$ are referred to as Adaptive-HARQ (with $M_{ACK}, N_{NACK}$ values), respectively.

As can be seen, Adaptive-SNR achieves the highest throughput among the evaluated repetition schemes, regardless of coherence time. In general, this is likely because Adaptive-SNR selects the repetition number that achieves the largest expected instantaneous throughput; Adaptive-SNR achieves at least forty percent more throughput than any of the fixed-repetition schemes, regardless of coherence time.

Compared to the fixed-repetition schemes, both Adaptive-HARQ (5,2) and Adaptive-HARQ (10, 3) can achieve 30 percent to 600 percent throughput gain when coherence time is large. In general, when coherence time is not very large (for example, 100 ms), Adaptive-HARQ (5,2) achieves a slightly higher throughput than Adaptive-HARQ (10, 3), likely because Adaptive-HARQ (5,2) is more responsive by using smaller $M_{ACK}$ and $N_{NACK}$ threshold values; thus the threshold values in use at any given time for a given UE can vary based on other factors. In any event, the technology described herein can achieve significantly higher throughput than any fixed repetition scheme.

Figure 8:
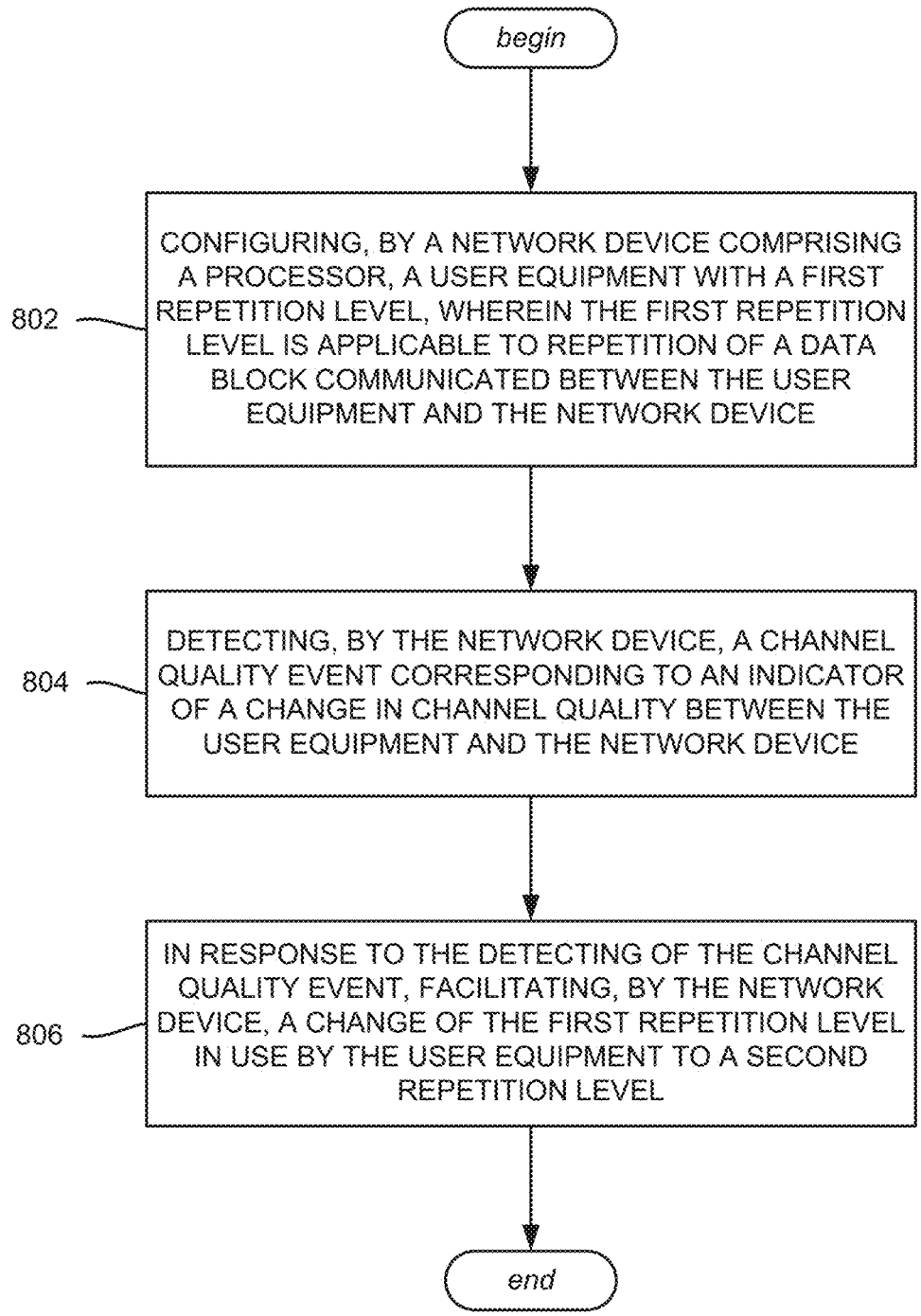
FIG. 8 illustrates an example flow diagram of aspects of network device operations, in accordance with various aspects and implementations of the subject disclosure.

One or more aspects, generally represented in FIG. 8, represent example operations comprising (operation 802) configuring, by a network device comprising a processor, a user equipment with a first repetition level, wherein the first repetition level is applicable to repetition of a data block communicated between the user equipment and the network device. Operation 804 represents detecting, by the network device, a channel quality event corresponding to an indicator of a change in channel quality between the user equipment and the network device. Operation 806 represents, in response to the detecting of the channel quality event, facilitating, by the network device, a change of the first repetition level in use by the user equipment to a second repetition level.

Detecting the channel quality event can comprise evaluating a channel quality indicator reported by the user equipment. Facilitating the change of the first repetition level to the second repetition level can comprise, in response to the channel quality indicator reported by the user equipment indicating an increase in signal quality, facilitating a decrease of the first repetition level to the second repetition level, and in response to the channel quality indicator reported by the user equipment indicating a decrease in the signal quality, facilitating an increase of the first repetition level to the second repetition level. Facilitating the change of the first repetition level to the second repetition level can comprise accessing a data structure that maps the channel quality indicator to a specified repetition level.

Detecting the channel quality event corresponding to the change in the channel quality can comprise receiving hybrid automatic repeat request feedback in response to a data block request, and facilitating the change of the first repetition level to the second repetition level can comprise facilitating the change of the first repetition level to the second repetition level based on the hybrid automatic repeat request feedback. Receiving the hybrid automatic repeat request feedback can comprise receiving a hybrid automatic repeat request acknowledgment, and facilitating the change of the first repetition level to the second repetition level can comprise facilitating an increase of an hybrid automatic repeat request acknowledgment counter, and based on determining that the hybrid automatic repeat request acknowledgment counter has reached an acknowledgement threshold value, facilitating a decrease of the first repetition level to change to the second repetition level. Facilitating the decrease of the first repetition level to the second repetition level can comprise dividing the first repetition level by two to obtain the second repetition level. In response to the receiving the hybrid automatic repeat request acknowledgment, operations can comprise, resetting, by the network device, a negative acknowledgment counter. Receiving the hybrid automatic repeat request feedback can comprise receiving a hybrid automatic repeat request negative acknowledgment, and facilitating the change of the first repetition level to the second repetition level can comprise facilitating an increase of an hybrid automatic repeat request negative acknowledgment counter, and based on a result of determining that the hybrid automatic repeat request negative acknowledgment counter has reached a negative acknowledgement threshold value, facilitating an increase of the first repetition level to the second repetition level.

Facilitating the increase of the first repetition level to the second repetition level can comprise multiplying the first repetition level by two to obtain the second repetition level. Aspects can comprise, in response to the receiving the hybrid automatic repeat request negative acknowledgment, resetting, by the network device, an acknowledgment counter. Detecting the channel quality event can comprise evaluating a channel quality indicator reported by the user equipment. Facilitating the change of the first repetition level to the second repetition level can comprise, in response to the channel quality indicator reported by the user equipment indicating an increase in signal quality, facilitating a decrease of the first repetition level to the second repetition level, or in response to the channel quality indicator reported by the user equipment indicating a decrease in the signal quality, facilitating an increase of the first repetition level to the second repetition level, or event corresponding to the change in the channel quality, or the detecting the channel quality event can comprise receiving hybrid automatic repeat request feedback in response to a data block request, and facilitating the change of the first repetition level to the second repetition level can comprise facilitating the change of the first repetition level to the second repetition level based on the hybrid automatic repeat request feedback.

Figure 9:
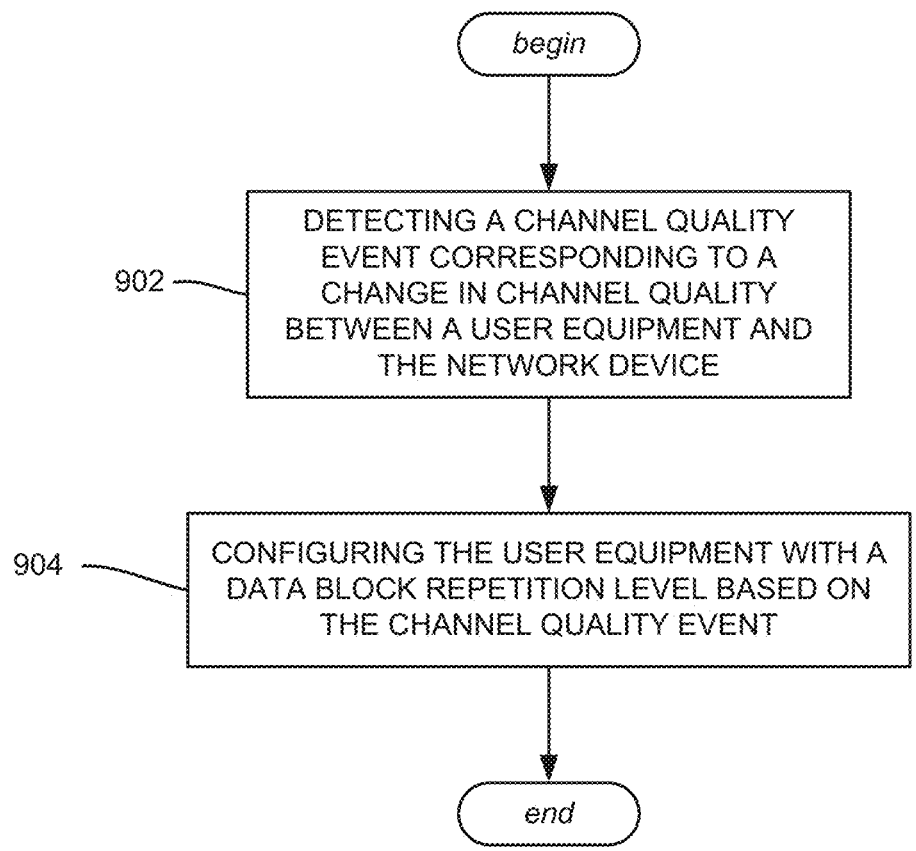
FIG. 9 illustrates an example flow diagram of aspects of a network device, in accordance with various aspects and implementations of the subject disclosure.

One or more aspects are directed towards example operations represented in FIG. 9, e.g., executed via a network device processor based on a memory that stores executable instructions that, when executed by the processor, facilitate performance of the operations. Operation 902 represents detecting a channel quality event corresponding to a change in channel quality between a user equipment and the network device. Operation 904 represents configuring the user equipment with a data block repetition level based on the channel quality event.

Detecting the channel quality event can comprise evaluating a channel quality indicator reported by the user equipment, and configuring the user equipment with the repetition level based on the channel quality event can comprise accessing a data structure that maps the channel quality indicator to a specified repetition level and configuring the user equipment with the specified repetition level as the data block repetition level.

Detecting the channel quality event corresponding to the change in the channel quality can comprise receiving hybrid automatic repeat request feedback, and configuring the user equipment with the data block repetition level based on the channel quality event can comprise changing a first data block repetition level in use by a the equipment to a second data block repetition level based on the hybrid automatic repeat request feedback.

Receiving the hybrid automatic repeat request feedback can comprise receiving a hybrid automatic repeat request acknowledgment, and changing the first data block repetition level to the second data block repetition level based on the channel quality event can comprise increasing an hybrid automatic repeat request acknowledgment counter, determining that the hybrid automatic repeat request acknowledgment counter has reached an acknowledgement threshold value, and based on the determining, decreasing the first data block repetition level to change to the second data block repetition level.

Receiving the hybrid automatic repeat request feedback can comprise receiving a hybrid automatic repeat request negative acknowledgment, and changing the first data block repetition level to the second data block repetition level based on the channel quality event can comprise increasing an hybrid automatic repeat request negative acknowledgment counter, determining that the hybrid automatic repeat request negative acknowledgment counter has reached a negative acknowledgement threshold value, and based on the determining, increasing the first data block repetition level to change to the second data block repetition level.

Figure 10:
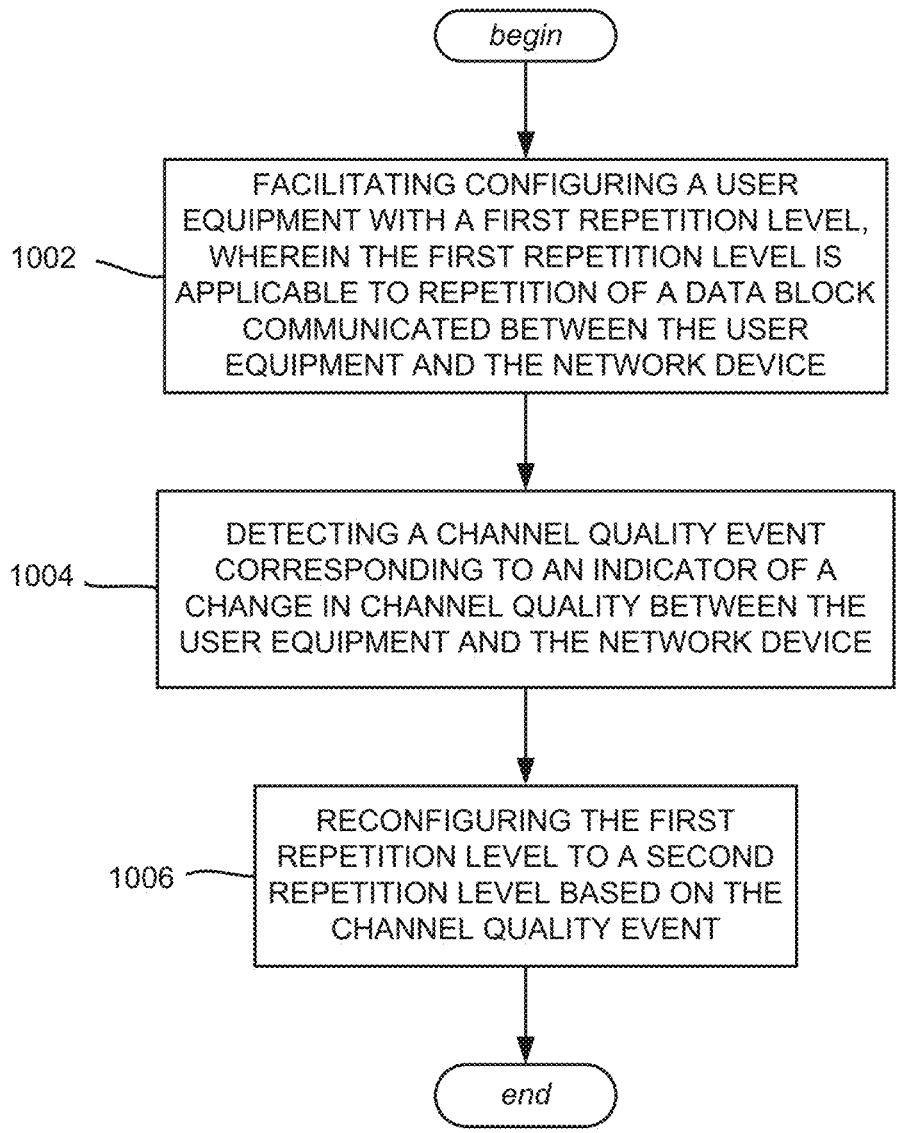
FIG. 10 illustrates an example flow diagram of aspects of network device operations, in accordance with various aspects and implementations of the subject disclosure.

FIG. 10 represents example operations, including operation 1002, which represents facilitating configuring a user equipment with a first repetition level, wherein the first repetition level is applicable to repetition of a data block communicated between the user equipment and the network device. Operation 1004 represents detecting a channel quality event corresponding to an indicator of a change in channel quality between the user equipment and the network device. Operation 1006 represents reconfiguring the first repetition level to a second repetition level based on the channel quality event.

Detecting the channel quality event can comprise evaluating a channel quality indicator reported by the user equipment, and reconfiguring the first repetition level to the second repetition level based on the channel quality event can comprise decreasing the first repetition level to change to the second repetition level in response to the channel quality indicator being determined to indicate improved signal quality, and increasing the first repetition level to change to the second repetition level in response to the channel quality indicator reported by the user equipment being determined to indicate reduced signal quality.

Detecting the channel quality event can comprise receiving hybrid automatic repeat request feedback from the user equipment in response to a data block request, and the reconfiguring the first repetition level to the second repetition level based on the channel quality event can comprise changing the first repetition level to the second repetition level based on the hybrid automatic repeat request feedback.

Detecting the channel quality event can comprise evaluating a channel quality indicator reported by the user equipment or receiving hybrid automatic repeat request feedback from the user equipment, and reconfiguring the first repetition level to the second repetition level based on the channel quality event can comprise changing the first repetition level to the second repetition level based on the channel quality indicator or based on the hybrid automatic repeat request feedback.

As can be seen, wireless radio coverage may be improved with better throughput given the same amount of bandwidth and infrastructure by the implementation of adaptive repetition as described herein. The adaptive repetition level schemes described herein tend to find a more optimal throughput without reducing coverage, e.g., to below a desired block error rate threshold.

Figure 11:
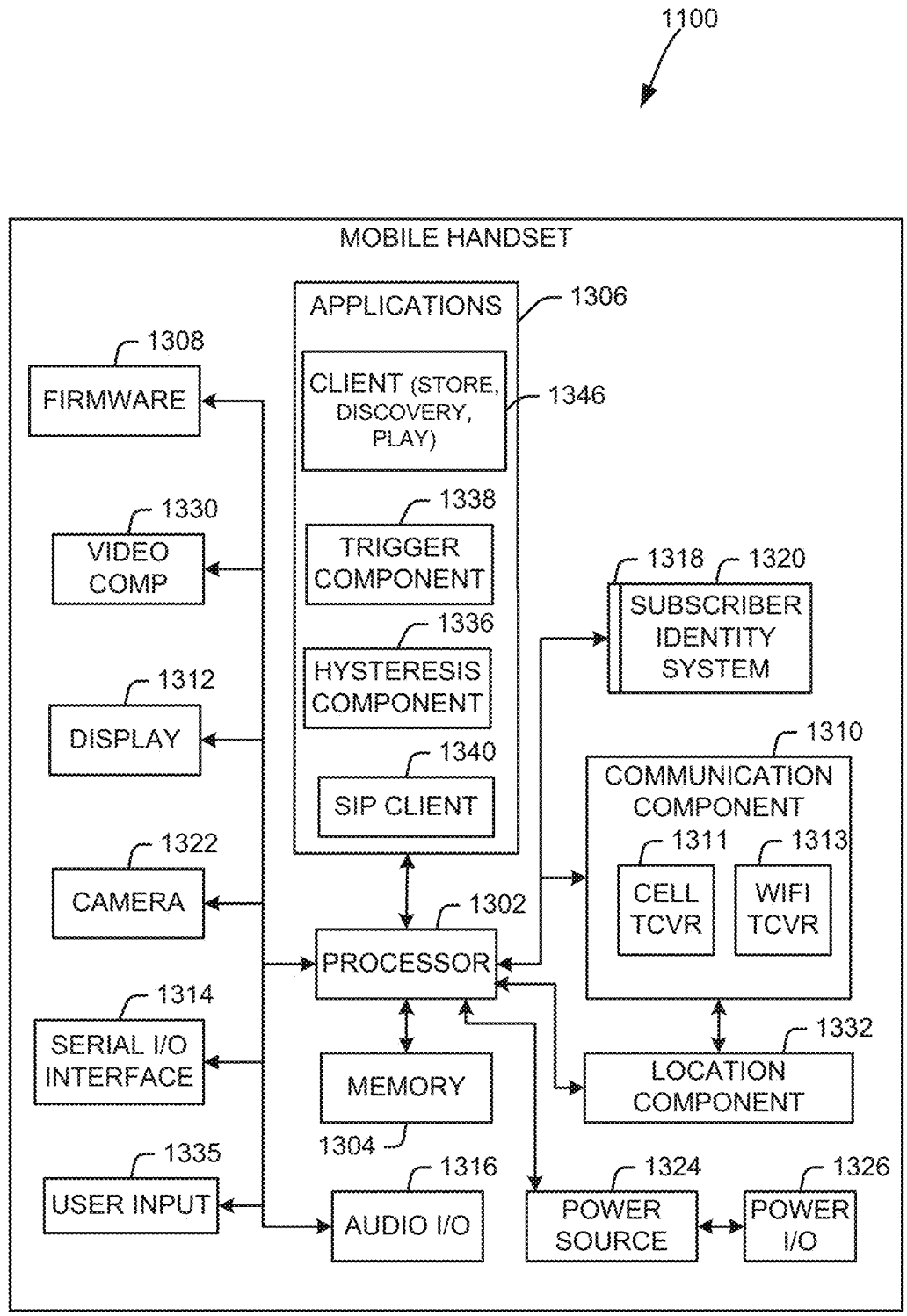
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
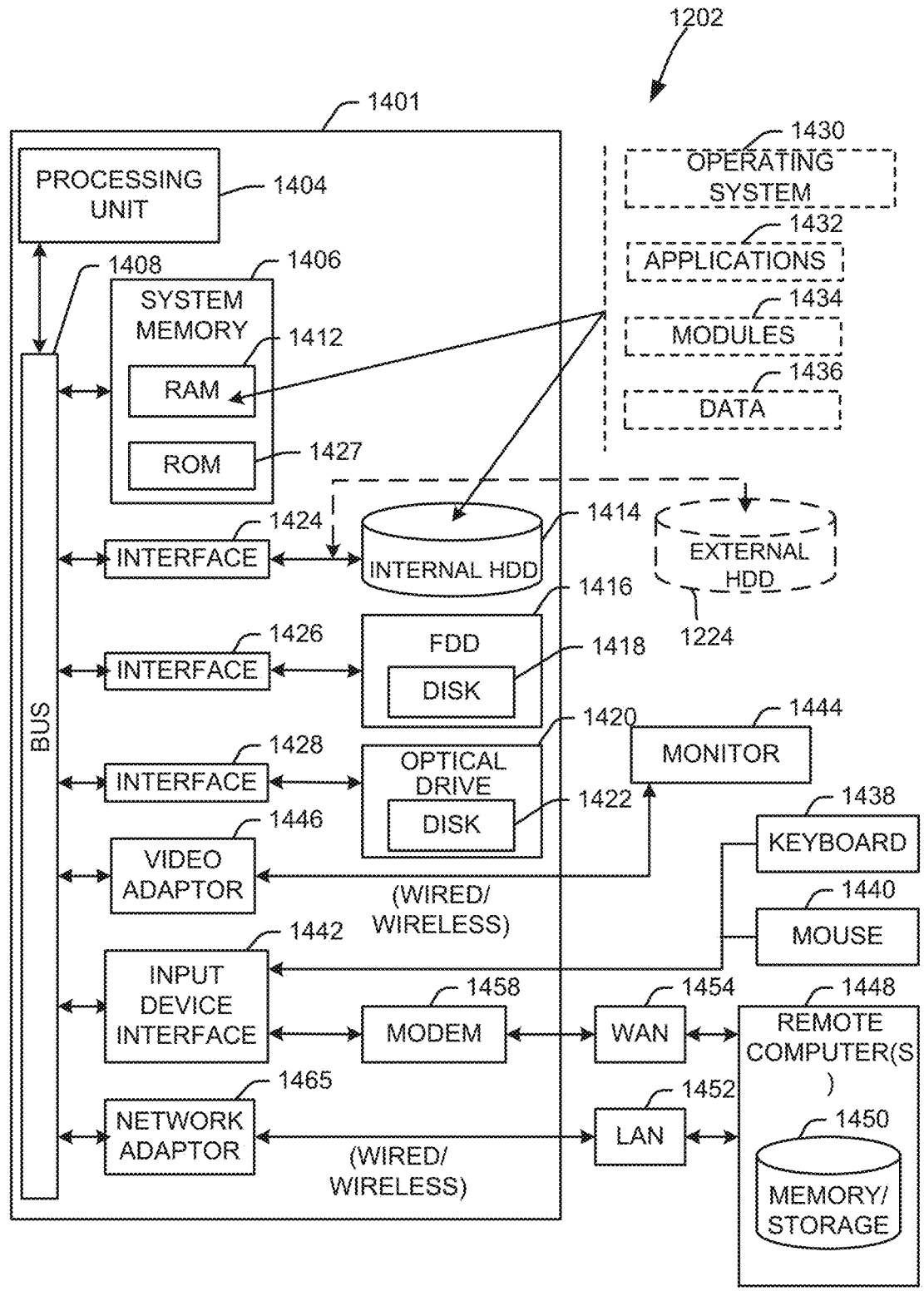
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 1220, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gate-ways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A method, comprising:
configuring, by network equipment comprising a processor, a user equipment with a first repetition level, wherein the first repetition level is applicable to repetition of a data block communicated between the user equipment and the network equipment for a transmission of the data block; and
in response to determining that a counter associated with hybrid automatic repeat request feedback has reached a threshold value that is greater than one count of the counter that indicates a change in channel quality between the user equipment and the network equipment, facilitating, by the network equipment, a change of the first repetition level in use by the user equipment to a second repetition level.

2. The method of claim 1, further comprising, in response to a data block request, adjusting, by the network equipment, the counter based on receiving the hybrid automatic repeat request feedback.

3. The method of claim 2, wherein the adjusting comprises increasing the counter in response to the hybrid automatic repeat request feedback comprising a hybrid automatic repeat request acknowledgment, and wherein facilitating the change of the first repetition level to the second repetition level comprises facilitating a decrease of the first repetition level to change to the second repetition level.

4. The method of claim 3, wherein facilitating the decrease of the first repetition level to the second repetition level comprises dividing the first repetition level by two to obtain the second repetition level.

5. The method of claim 2, wherein the adjusting comprises decreasing the counter in response to the hybrid automatic repeat request feedback comprising a hybrid automatic repeat request negative acknowledgment, and wherein facilitating the change of the first repetition level to the second repetition level comprises facilitating an increase of the first repetition level to the second repetition level.

6. The method of claim 5, wherein facilitating the increase of the first repetition level to the second repetition level comprises multiplying the first repetition level by two to obtain the second repetition level.

7. The method of claim 1, wherein facilitating the change of the first repetition level to the second repetition level comprises accessing a data structure that maps the counter to a specified repetition level.

8. Network equipment, comprising:
a processor; and
a memory that stores executable instructions that, when executed by the processor, facilitate performance of operations, comprising:
setting a first repetition level for a user equipment, wherein the first repetition level is applicable to repetition of a data block communicated between the user equipment and the network equipment for a transmission of the data block; and
in response to determining that a counter associated with hybrid automatic repeat request feedback has reached a threshold value that is at least two counts of the counter that indicates a change in channel quality between the user equipment and the network equipment, facilitating an adjustment of the first repetition level in use by the user equipment to a second repetition level.

9. The network equipment of claim 8, wherein the operations further comprise modifying the counter based on receiving the hybrid automatic repeat request feedback in response to a data block request.

10. The network equipment of claim 9, wherein the modifying comprises increasing the counter in response to the hybrid automatic repeat request feedback comprising a hybrid automatic repeat request acknowledgment, and wherein facilitating the adjustment of the first repetition level to the second repetition level comprises facilitating a decrease of the first repetition level to change to the second repetition level.

11. The network equipment of claim 10, wherein facilitating the decrease of the first repetition level to the second repetition level comprises dividing the first repetition level by two to obtain the second repetition level.

12. The network equipment of claim 9, wherein the modifying comprises decreasing the counter in response to the hybrid automatic repeat request feedback comprising a hybrid automatic repeat request negative acknowledgment, and facilitating the adjustment of the first repetition level to the second repetition level comprises facilitating an increase of the first repetition level to the second repetition level.

13. The network equipment of claim 12, wherein facilitating the increase of the first repetition level to the second repetition level comprises multiplying the first repetition level by two to obtain the second repetition level.

14. The network equipment of claim 8, wherein facilitating the adjustment of the first repetition level to the second repetition level comprises accessing a data structure that maps the counter to a specified repetition level.

15. A non-transitory machine-readable medium, comprising executable instructions that, when executed by a processor of network equipment, facilitate performance of operations, comprising:
configuring a first repetition level for a user equipment, wherein the first repetition level is applicable to repetition of a data block communicated between the user equipment and the network equipment for a transmission of the data block; and
in response to determining that a counter associated with hybrid automatic repeat request feedback has reached a threshold value that is greater than one that indicates a change in channel quality between the user equipment and the network equipment, modifying the first repetition level in use by the user equipment to a second repetition level.

16. The non-transitory machine-readable medium of claim 15, wherein the operations further comprise adjusting the counter based on receiving the hybrid automatic repeat request feedback in response to a data block request.

17. The non-transitory machine-readable medium of claim 16, wherein the adjusting comprises increasing the counter in response to the hybrid automatic repeat request feedback comprising a hybrid automatic repeat request acknowledgment, and wherein modifying the first repetition level to the second repetition level comprises facilitating a decrease of the first repetition level to change to the second repetition level.

18. The non-transitory machine-readable medium of claim 17, wherein facilitating the decrease of the first repetition level to the second repetition level comprises dividing the first repetition level by two to obtain the second repetition level.

19. The non-transitory machine-readable medium of claim 16, wherein the adjusting comprises decreasing the counter in response to the hybrid automatic repeat request feedback comprising a hybrid automatic repeat request negative acknowledgment, and wherein modifying the first repetition level to the second repetition level comprises facilitating an increase of the first repetition level to the second repetition level.

20. The non-transitory machine-readable medium of claim 19, wherein facilitating the increase of the first repetition level to the second repetition level comprises multiplying the first repetition level by two to obtain the second repetition level.

* * * * *